United States Patent [19]

Reid

[11] 4,173,051

[45] Nov. 6, 1979

[54] VEGETABLE WASHER

[76] Inventor: Joyce P. Reid, 1316 W. 115th St., Chicago, Ill. 60643

[21] Appl. No.: 919,074

[22] Filed: Jun. 26, 1978

[51] Int. Cl.² .............................................. A23N 13/00

[52] U.S. Cl. ........................................ 15/3.12; 99/593; 134/191; 134/192

[58] Field of Search ...................... 15/3.1, 3.12; 134/32, 134/141, 188, 192, 193, 191; 99/593

[56] References Cited

U.S. PATENT DOCUMENTS

| | | | |
|---|---|---|---|
| 880,637 | 3/1908 | DeVito | 134/188 |
| 1,675,655 | 7/1928 | McManus | 134/141 |
| 1,927,943 | 9/1933 | Long | 134/188 |
| 2,666,440 | 1/1954 | Collins | 134/188 |
| 2,966,159 | 12/1960 | Ruegnitz | 134/188 |
| 3,066,334 | 12/1962 | Kelly | 15/3.12 |
| 3,428,060 | 2/1969 | Spivey | 134/141 |

*Primary Examiner*—Edward L. Roberts

[57] ABSTRACT

An apparatus for effectively washing food articles of many different varieties, especially fruits and vegetables, which conveniently can be used as a household appliance. The washing apparatus is comprised of a container for housing the food articles, an agitation system and washing system for removing undesired foreign materials from the surface of the food articles without causing bruising or damage, and a discharge system.

4 Claims, 6 Drawing Figures

Fig. 1.
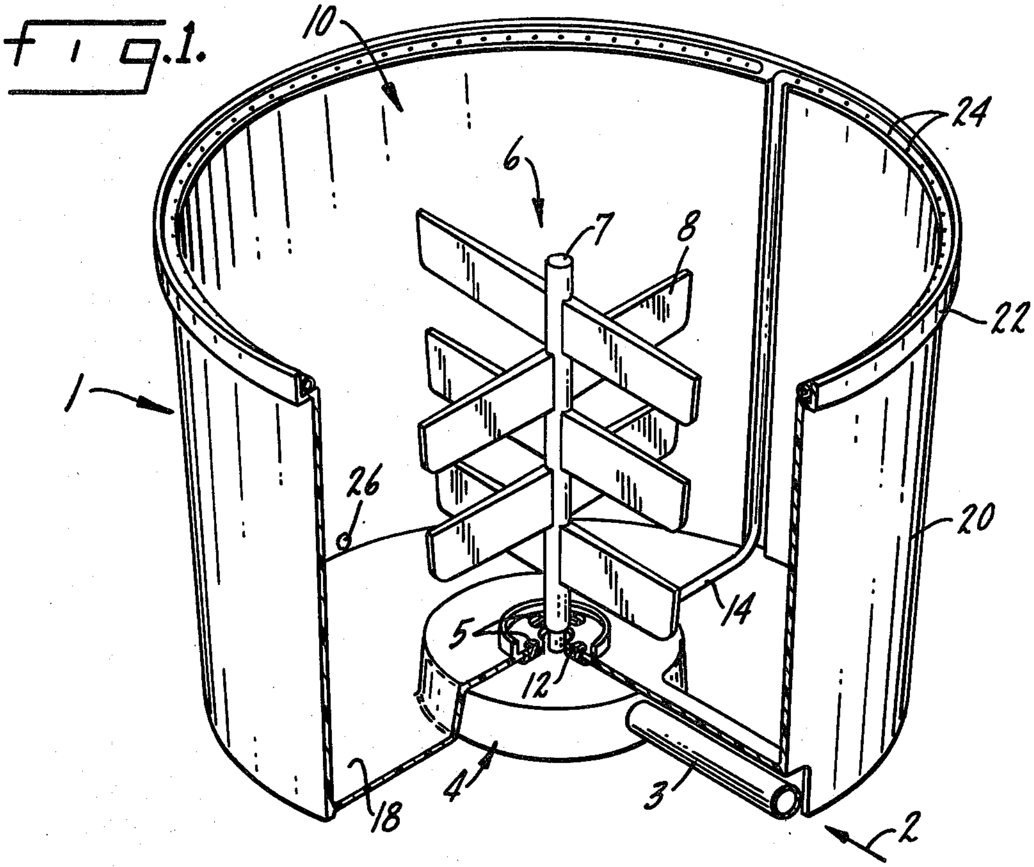
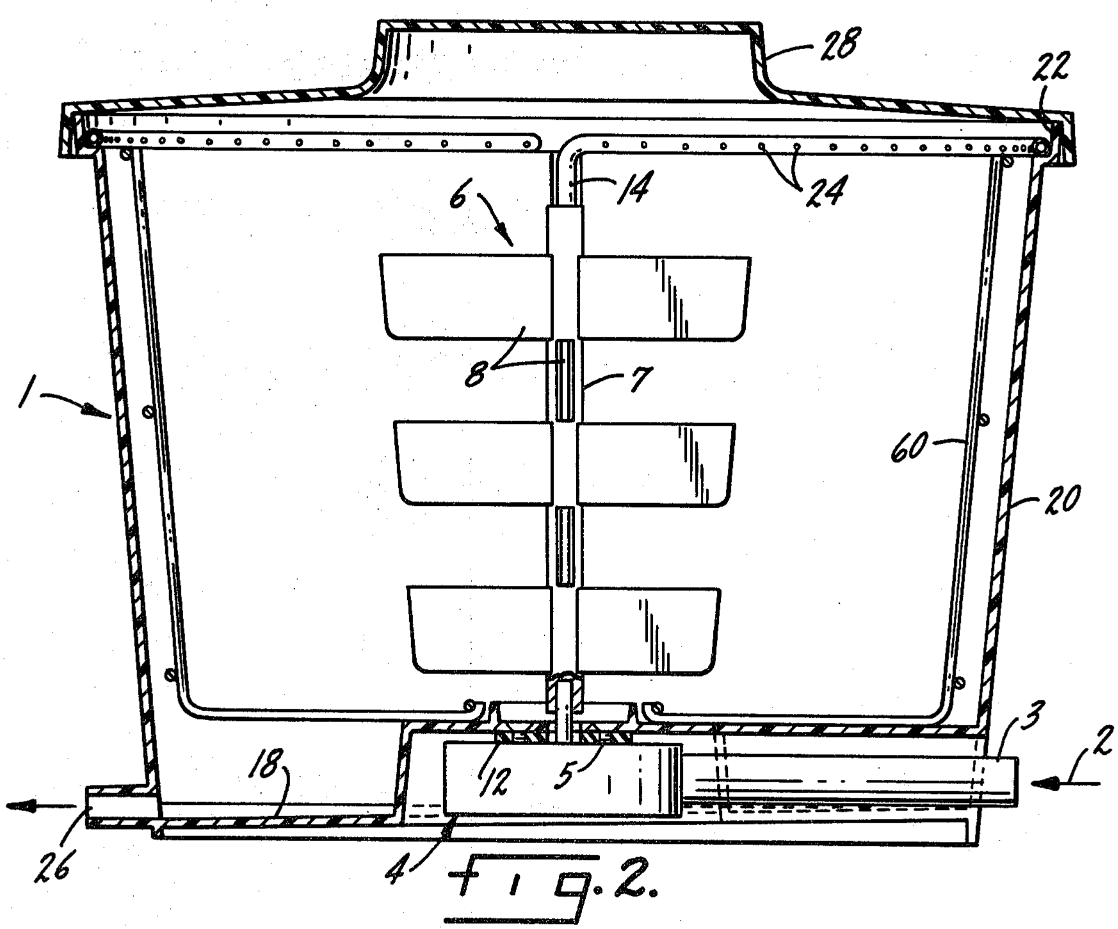
Fig. 2.

Fig. 3.
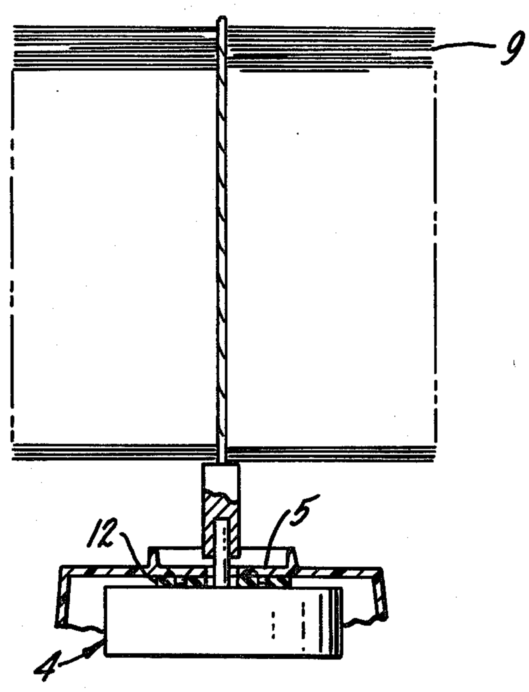
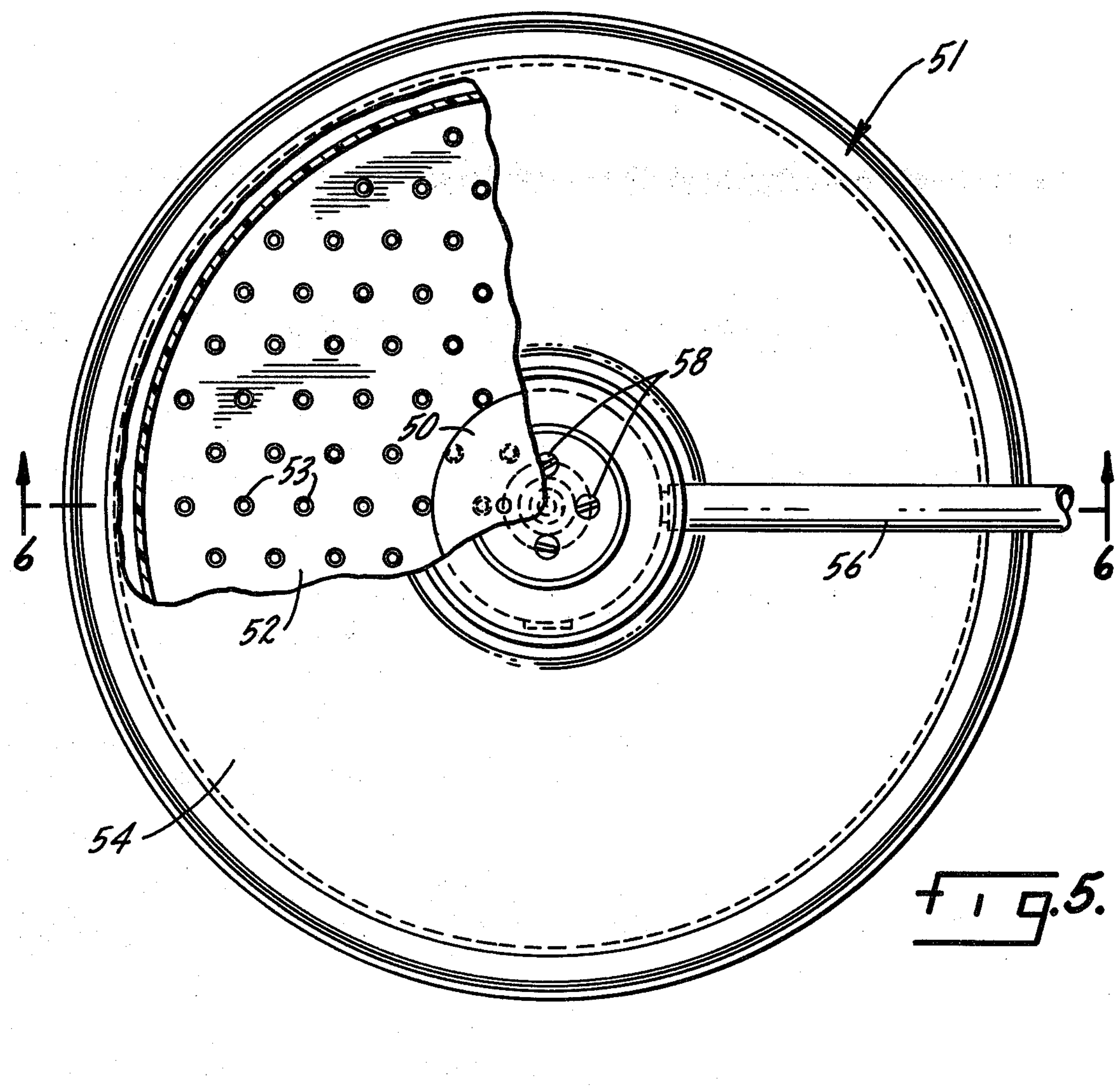
Fig. 5.

VEGETABLE WASHER

This invention relates generally to the art of washing and cleaning food articles, and especially to washing and cleaning fruits and vegetables by means of a convenient and inexpensive household appliance.

BACKGROUND OF THE INVENTION

Various devices for washing and cleaning food articles have been proposed. However, all such devices have had disadvantages, particularly in being too expensive, complicated, inconvenient or otherwise not feasible or adaptable for use as a household appliance. Other problems and disadvantages of these methods and devices are that they are capable of being used only with a limited variety of food articles; they do not effectively remove or dislodge foreign materials such as dirt, sand, insects and the like from the articles being washed; or they impart so great a force against the surfaces of the food articles in the process of washing them that they cause bruises or other damage.

SUMMARY OF THE INVENTION

Accordingly, a primary object of this invention is to provide an inexpensive device for washing and cleaning a wide variety of food articles that can be used as a household appliance.

Another important object of the invention is to provide a food article washer that does not unduly bruise or damage the articles being washed or their surfaces, but at the same time adequately and effectively removes undesired foreign materials from the articles.

A further object of the invention is to provide a food article washer that is especially adapted for use in connection with washing many different varieties and shapes of vegetables and fruits.

Another object of the invention is to provide a food article washer having a convenient means for introducing and removing the food articles into and from the washer.

Yet another object of the invention is to provide a food article washer that is adaptable for use in connection with an ordinary kitchen water faucet.

Other objects and advantages will be apparent from the following description of the invention.

The invention is illustrated in the accompanying drawing wherein:

FIG. 1 is a cut-away view with parts omitted for clarity of one embodiment of the invention wherein turbine means are provided in the base region of the apparatus and impeller means are disposed within the central zone and are comprised of a plurality of blades;

FIG. 2 is a sectional view of the embodiment shown in FIG. 1;

FIG. 3 is a sectional view of another impeller means comprised of a plurality of bristles;

FIG. 5 is a top view with parts broken away of the embodiment shown in FIG. 4.

Like reference numerals will be used to refer to like parts from figure to figure of the drawing.

Figure 4:
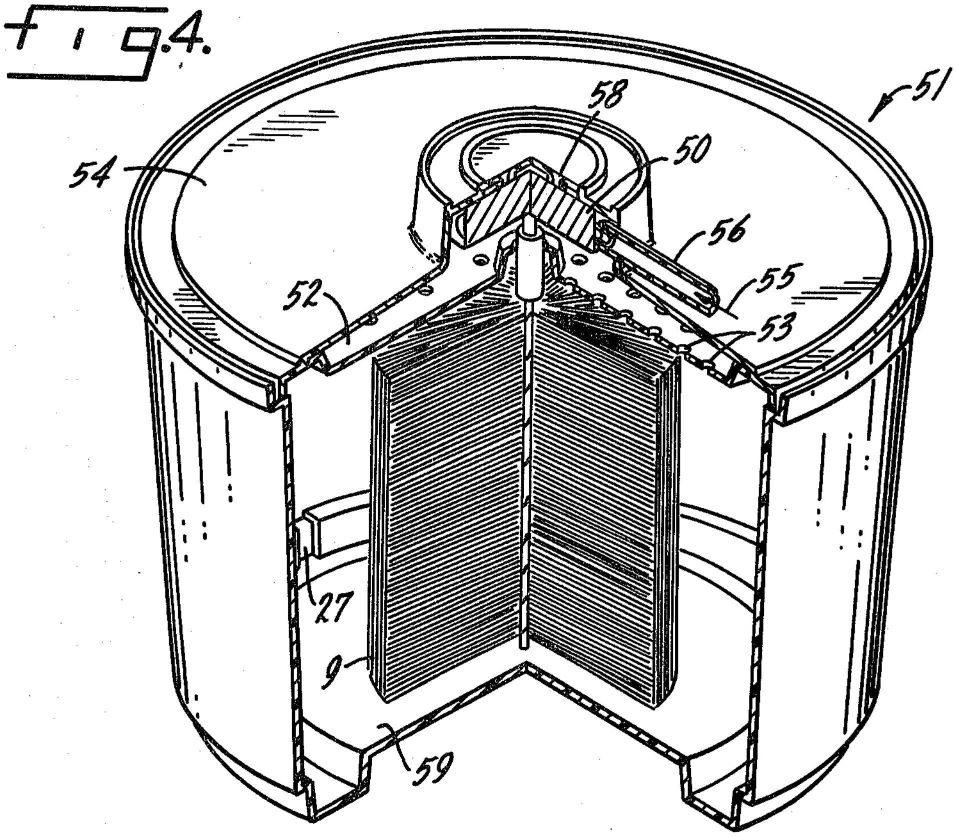
FIG. 4 is a cut-away view of another embodiment wherein turbine means are provided in the lid of the apparatus and impeller means are comprised of a plurality of bristles.
Figure 6:
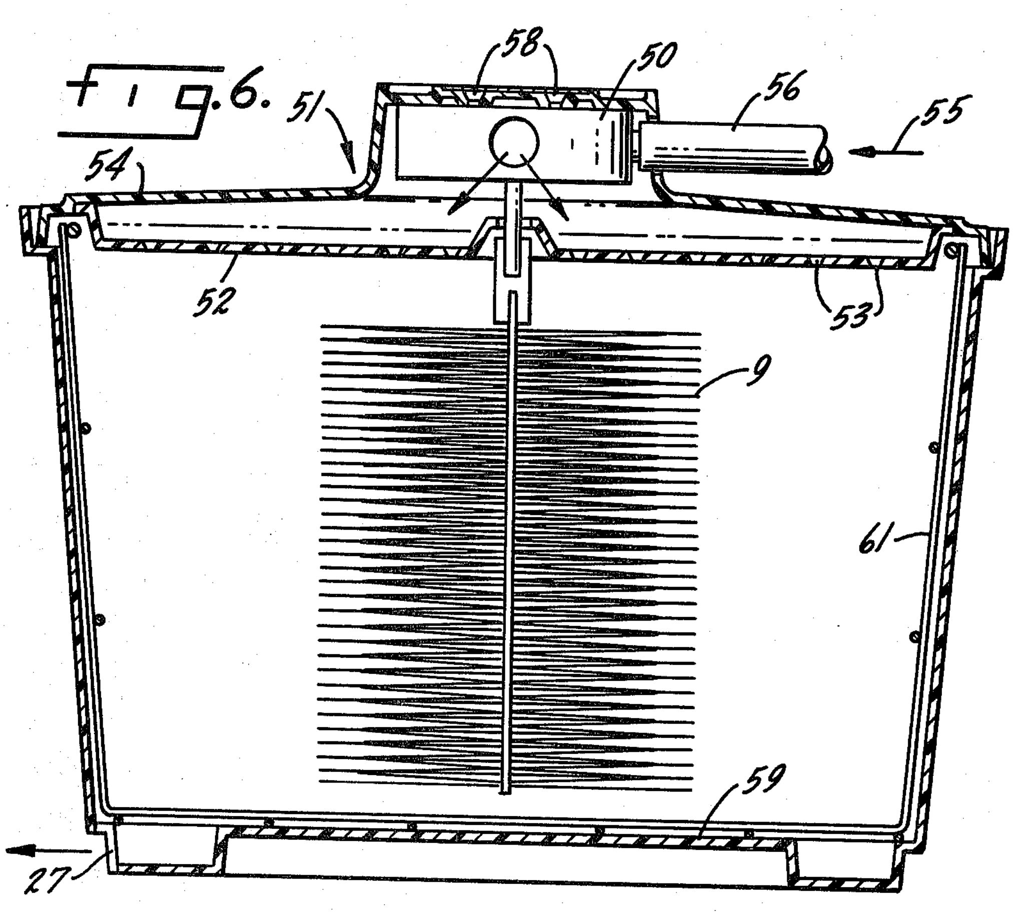
FIG. 6 is a sectional view taken on line 6—6 of FIG. 4.

Referring to the drawing, one embodiment of the invention is shown in FIGS. 1 through 3 and an alternate embodiment is shown in FIGS. 4 through 6. It will be understood that all embodiments of the apparatus generally include a container for housing the food articles, an agitation system, a washing system, and a discharge system.

Referring to FIG. 1, it will be appreciated that the food articles to be washed are introduced into the container, indicated generally at 1, through the top region thereof as shown at 10. The container is adapted to be connected to a water source 2 by which pressurized water is supplied through conduit means 3 into turbine means, indicated generally at 4. The pressurized water source may be the water faucet of a conventional kitchen sink. The turbine means 4 is secured to the base region of the container by conventional securement means, such as screws 5, and is separated therefrom by a conventional gasket 12. The turbine means may comprise a conventional water turbine operable by the flow of the pressurized water directed therein through the conduit means 3.

The turbine means is vertically oriented with respect to the impeller means, shown generally at 6. The turbine means in combination with the impeller means substantially comprise the agitation system of the invention.

In a first embodiment as shown in FIG. 1, the impeller means includes a plurality of blades 8 which project substantially horizontally from a shaft 7 which is suitably rotatably mounted at its base into the pumping means so that operation of the turbine causes the impeller to rotate substantially about the longitudinal axis of the apparatus. It will be understood that this rotation causes the blades to come into contact with the food articles placed in the container and causes their agitation. This agitation, in turn, causes the removal of undesirable foreign materials, such as dirt, sand, insects and the like from the food articles. The blades of the impeller means are constructed of a suitable deformable or yieldable material such as rubber, plastic, or thin metal, so that their contact with the food articles does not cause damage or bruises to the articles or to their surfaces.

FIG. 3 shows another embodiment of the impeller means of the invention wherein the impeller means comprises a plurality of substantially horizontally outwardly projecting bristles 9. The bristles are made of a suitable material such as nylon, for example, so that their contact with the food articles in the container causes agitation of the food articles without causing damage or bruises to the food articles or their surfaces. It will be appreciated that both the bristle impeller means and the blade impeller means may be interchangeably used.

The washing system of the invention cooperates with the agitation system and further facilitates the removal of undesirable materials from the food articles. As shown in FIG. 1, the washing system includes tubular means 14, such as a conventional flexible tube, which is suitably connected to the turbine means so as to permit the pressurized water discharged therefrom to pass through the tube. The tube runs from the turbine means across the base region 18 and wall 20 of the container to the top of the container where it is mounted within a suitably formed chamber 22 across the surface of the upper perimeter of the container wall. The other end of the tube is closed so that the introduction of the pressurized water into the tube is discharged through a plurality of suitably formed apertures 24. The discharged water from the apertures forms a plurality of water streams directed at the food articles in the container. Thus, it will be appreciated that the food articles are simultaneously being agitated by the impeller means while being washed with streams of water so that removal of undesirable foreign materials from their surfaces is effected without causing damage or bruises.

The water accumulated in the container and the removed foreign materials are discharged from the apparatus via the discharge system of the invention as shown in FIG. 2. The discharge system includes an outlet 26 formed into the lower region of the wall of the container. It will be noted that the upper surface of the base region of the container 18 is suitably angularly disposed so that the accumulated water and removed foreign materials are permitted to be discharged by gravity through the outlet 26. It is apparent that suitable conduit means may be connected to the outlet to permit the discharge of the water and removed foreign materials into the drain of the kitchen sink. As shown in FIG. 2, a suitably formed lid 28 may be fitted across the top of the container so as to prevent the undesirable discharge of water through the top of the container while the apparatus is in use.

An alternate embodiment of the invention is shown in FIGS. 4 through 6.

Referring to FIG. 6, turbine means, shown at 50, is contained within the lid of the container, indicated generally at 51. The lid is comprised of a base 52, having suitably formed apertures 53, and a top 54 suitably formed to permit inclusion of the turbine means within the lid. The turbine may be secured to the lid by conventional securement means, such as screws 58.

It will be appreciated that water from a pressurized water supply source 55 may be supplied into the turbine means through conduit means 56 to operate the turbine. The turbine, in turn, is suitably connected to impeller means in a similar manner as that indicated aforesaid so that operation of the turbine causes the impeller to rotate substantially about the longitudinal axis of the apparatus and thereby agitate the food articles therein.

It will also be noted that the washing system of the invention is accommodated by the water flowing through the turbine and into the lid where it is discharged through the apertures in the base of the lid. A preferred configuration for said apertures is shown in FIG. 5.

A discharge system having an outlet 27 as shown in FIG. 6 similar to the discharge system indicated aforesaid may be used to discharge the water and removed foreign materials from the apparatus. The configuration of the base region 59 of the container providing for the discharge of the accumulated matter is shown in FIG. 4.

Thus, in this embodiment wherein the turbine means is contained within the lid of the apparatus, the food articles in the container are simultaneously being agitated and washed in order to remove foreign materials from them without causing damage or bruises.

It will be appreciated that except for the above modifications, this alternate embodiment of the apparatus is substantially similar to the aforesaid embodiment. In particular, it will be readily appreciated that the impeller means may be comprised either of bristles or of blades as indicated aforesaid.

An alternate embodiment of the container of the apparatus may be used with either of the above two embodiments of the apparatus. Referring to FIG. 2 which shows the first embodiment, a basket 60 containing the food articles may easily be placed within the container before washing and removed afterwards to facilitate the introduction and removal of the food articles being washed. The basket is suitably webbed so as to simultaneously contain the food articles and permit water and removed foreign materials to pass through the basket and be discharged from the container.

FIG. 6 shows a basket 61 which is similarly adapted for use with the alternate embodiment of the apparatus.

Although preferred embodiments of the invention have been illustrated and described, it will at once be apparent to those skilled in the art that modifications and betterments of the invention may be made within the spirit and scope of the inventive concept.

It is intended that the scope of the invention be limited not by the scope of the foregoing exemplary description, but, rather by the scope of the hereinafter appended claims when interpreted in light of the pertinent prior art.

What is claimed is:

1. An apparatus for washing and cleaning food articles including, in combination (a) means for housing said food articles,
 said housing means including,
 a base region,
 a wall region formed with said base region, and
 a lid,
 said lid being removably attachable to the upper portion of said wall region so as to permit the introduction and removal of said food articles to and from the apparatus when said lid is in a first, removed position, and to prevent the discharge of cleaning fluid and said food articles from the apparatus when said lid is in a second, attached position, (b) means for agitating said food articles and a cleaning fluid within said housing means,
 said agitation means including impeller means responsive to turbine means, (c) means for introducing said cleaning fluid under pressure into said housing means to generate said turbine means, (d) means for spraying said cleaning fluid discharged from said turbine means at said food articles being agitated and washed,
 said spraying means permitting said cleaning fluid to be directed at said food articles in a plurality of streams so as to further wash said food articles, and (e) means for discharging said cleaning fluid from said apparatus.

2. The apparatus for washing and cleaning food articles of claim 1, further characterized in that said turbine means is located near the base region of said housing means, said spraying means includes conduit means connected at one end to said turbine means to permit the passage of cleaning fluid discharged from said turbine means through said conduit means, and suitably mounted along said wall of said housing means and closed at the other end so that said cleaning fluid passing therethrough may be discharged through a plurality of apertures therein at said food articles, and said impeller means is substantially vertically disposed about the logitudinal axis of said housing means and is rotatably mounted with said turbine means and includes a plurality of substantially horizontal projections which agitate said food articles and said cleaning fluid upon rotation of said impeller means.

3. The apparatus for washing and cleaning food articles of claim 1 further characterized in that said lid includes a top region and a base region, said turbine means is located substantially between said top region and said base region of said lid, said spraying means includes a plurality of apertures in said base region of said lid through which said cleaning fluid discharged from said turbine means is emitted in a plurality of streams at said food articles, and said impeller means is substantially vertically disposed about the logitudinal axis of said housing means and is rotatably mounted with said turbine means and includes a plurality of substantially horizontal projections which agitate said food articles and said cleaning fluid upon rotation of said impeller means.

4. The apparatus for washing and cleaning food articles of claims 2 or 3 further characterized in that said housing means includes a basket for containing said food articles, said basket being suitably webbed so as to permit removed foreign articles and said cleaning fluid to pass therethrough.

* * * * *